(12) United States Patent
Hwang et al.

(10) Patent No.: US 9,564,980 B2
(45) Date of Patent: Feb. 7, 2017

(54) MOBILE TELECOMMUNICATION SYSTEM WITH NOISE RATIO ESTIMATION MECHANISM AND METHOD OF OPERATION THEREOF

(75) Inventors: Insoo Hwang, San Diego, CA (US); Heejin Roh, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 260 days.

(21) Appl. No.: 13/590,567

(22) Filed: Aug. 21, 2012

(65) Prior Publication Data

US 2013/0065581 A1    Mar. 14, 2013

Related U.S. Application Data

(60) Provisional application No. 61/533,164, filed on Sep. 9, 2011, provisional application No. 61/534,379, filed on Sep. 13, 2011.

(51) Int. Cl.
| | | |
|---|---|---|
| *H04W 4/00* | (2009.01) | |
| *H04B 17/336* | (2015.01) | |
| *H04B 17/26* | (2015.01) | |
| *H04B 17/345* | (2015.01) | |

(52) U.S. Cl.
CPC ............. *H04B 17/336* (2015.01); *H04B 17/26* (2015.01); *H04B 17/345* (2015.01)

(58) Field of Classification Search
USPC ......................................... 455/403, 522, 69, 67.11–67.17, 455/422.1–425
See application file for complete search history.

(56) References Cited

U.S. PATENT DOCUMENTS

| | | | |
|---|---|---|---|
| 7,693,034 B2* | 4/2010 | Singh et al. | 370/208 |
| 8,144,822 B2* | 3/2012 | Kawamoto et al. | 375/346 |
| 2005/0002324 A1 | 1/2005 | Sutivong et al. | |
| 2007/0036064 A1 | 2/2007 | Song et al. | |
| 2007/0263712 A1* | 11/2007 | Ling | H04L 1/20 375/227 |
| 2009/0141841 A1 | 6/2009 | Dateki | |
| 2009/0179795 A1* | 7/2009 | Zhodzishsky et al. | 342/357.12 |
| 2011/0167321 A1* | 7/2011 | Hwang et al. | 714/786 |

OTHER PUBLICATIONS

Zyren, "Overview of the 3GPP Long Term Evolution Physical Layer", Jul. 2007, p. 27 pgs, Publisher: Freescale Semiconductor.

* cited by examiner

*Primary Examiner* — Vladimir Magloire
*Assistant Examiner* — Sayed T Zewari
(74) *Attorney, Agent, or Firm* — IP Investment Law Group

(57) ABSTRACT

A method of operation of a mobile telecommunication system includes: measuring a received reference signal; removing a guard portion from the received reference signal; determining a noise variance estimate from both a noise region of the received reference signal and a noise sample in a signal region of the received reference signal, or calculating a dispersion power of a noise region of the received reference signal and determining the noise variance estimate based on at least a dispersion power; and calculating a signal to noise ratio from the noise variance estimate for adjusting a receiver device.

16 Claims, 9 Drawing Sheets

MOBILE TELECOMMUNICATION SYSTEM WITH NOISE RATIO ESTIMATION MECHANISM AND METHOD OF OPERATION THEREOF

CROSS-REFERENCE TO RELATED APPLICATION(S)

This application claims the benefit of U.S. Provisional Patent Application Ser. No. 61/533,164 filed Sep. 9, 2011 and 61/534,379 filed Sep. 13, 2011, and the subject matter thereof is incorporated herein by reference thereto.

TECHNICAL FIELD

The present invention relates generally to a mobile telecommunication system, and more particularly to a mobile telecommunication system with noise ratio estimation mechanism.

BACKGROUND ART

Modern portable consumer and industrial electronics, especially client devices such as cellular phones, portable digital assistants, navigation systems, and combination devices, are providing increasing levels of functionality to support modern life including mobile data and voice services. Research and development in the existing technologies can take a myriad of different directions.

As users become more empowered with the growth of mobile service devices, new and old paradigms of cellular service stations are becoming essential for users to take advantage of this new mobile data and voice space. Base stations can provide mobile data and voice services. Base stations allow a Mobile Station, such as a User Equipment, to connect to its voice or data services remotely via radio frequency communication. Noise ratio calculation mechanisms help the mobile stations and the base stations manage the communication channel and properly decode symbols transmitted over the radio frequency.

Mobile telecommunication systems have been incorporated in cellphones, handheld devices, automobiles, notebooks, and other portable products. Today, these systems aid users by decoding audio and multimedia data over portable devices and manage the radio frequency communication between the user equipment and the nearby servicing base stations. The proper noise ratio estimation prevents interruption of services because of delay, noise, or interference within the communication channels. However, the accuracy and consistency of these noise ratio estimation mechanisms continue to challenge commercial applicability of these systems.

Thus, a need still remains for a mobile telecommunication system with a noise ratio estimation mechanism to adjust telecommunication receiver for better throughput. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a mobile telecommunication system including: measuring a received reference signal; removing a guard portion from the received reference signal; determining a noise variance estimate from both a noise region of the received reference signal and a noise sample in a signal region of the received reference signal; and calculating a signal to noise ratio from the noise variance estimate for adjusting the receiver device.

The present invention provides a method of operation of a mobile telecommunication system including: measuring a received reference signal; removing a guard portion from the received reference signal; calculating a dispersion power of a noise region of the received reference signal; determining a noise variance estimate based on at least the dispersion power; and calculating a signal to noise ratio from the noise variance estimate for adjusting the receiver device.

The present invention provides a mobile telecommunication system including: a radio frequency module, for measuring a received reference signal; a symbol isolation module, coupled to the radio frequency module, for removing a guard portion from the received reference signal; a noise variance module, coupled to the symbol isolation module, for determining a noise variance estimate from both a noise region of the received reference signal; and a noise sample in a signal region of the received reference signal; and a noise ratio module, coupled to the noise variance module, for calculating a signal to noise ratio from the noise variance estimate for adjusting a receiver device.

The present invention provides a mobile telecommunication system including: a radio frequency module, for measuring a received reference signal; a symbol isolation module, coupled to the radio frequency module, for removing a guard portion from the received reference signal; a leakage estimation module, coupled to a noise variance module, for calculating a dispersion power of a noise region of the received reference signal; the noise variance module, coupled to the symbol isolation module and the leakage estimation module, for determining a noise variance estimate based on at least the dispersion power; and a noise ratio module, coupled to the noise variance module, for calculating a signal to noise ratio from the noise variance estimate for adjusting a receiver device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
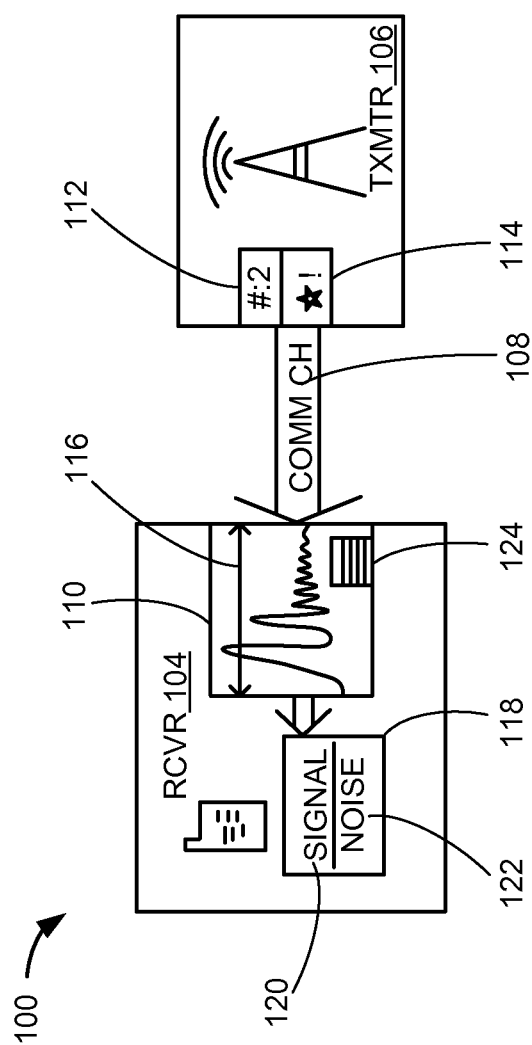
FIG. 1 is a mobile telecommunication system with noise ratio estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a mobile telecommunication system 100 with noise ratio estimation mechanism in an embodiment of the present invention. The mobile telecommunication system 100 includes a receiver device 104. The receiver device 104 can be a user equipment ("UE"), but can also be a base station. The receiver device 104 can be connected to a transmitter device 106 via a communication channel 108. The transmitter device 106 can be a base station, but can also be an UE. The receiver device 104 is defined as an electronic device capable of receiving signals across the communication channel 108. The transmitter device 106 is defined as an electronic device capable of transmitting signals across the communication channel 108. The receiver device 104 can be the same type of device as the transmitter device 106.

For example, the communication channel 108 can be a wireless radio frequency channel, a multi-channel cellular network, an orthogonal frequency division multiplexing ("OFDM") network, an Evolved High Speed Packet Access ("HSPA+") network, a Third Generation Partnership Project Long Term Evolution ("3GPP LTE") network, a 3GPP LTE-Advanced network, or other cellular network.

The communication channel 108 can be a variety of networks. For example, the communication channel 108 can include multi-band radio frequency communication, wireless communication, optical, or any combination thereof. Satellite communication, cellular communication, and worldwide interoperability for microwave access (WiMAX) are examples of wireless communication that can be included in the communication channel 108.

For example, the receiver device 104 can be of any of a variety of devices, such as a cellular phone, personal digital assistant, a notebook computer, automotive telematic navigation system, or other multi-functional mobile communication or entertainment device. The receiver device 104 can also be a device, such as evolve Node B ("eNB"), a cellular radio station, a cell tower, a cellular routing device, a relay station, or other radio receiving devices. The receiver device 104 can be a standalone device, or can be incorporated with a structure, for example a building, a vehicle, or a tower. The receiver device 104 can couple to the communication channel 108 to communicate with the transmitter device 106.

The receiver device 104 can be centralized in a single computer room, distributed across different rooms, attached to a building, distributed across different geographical locations, embedded within a telecommunications network, or attached to a tower. The receiver device 104 can have a means for coupling with the communication channel 108 to communicate with the transmitter device 106. The receiver device 104 can also be a mobile type device.

For example, the transmitter device 106 can be of any of a variety of devices, such as a cellular phone, personal digital assistant, a notebook computer, automotive telematics navigation system, or other multi-functional mobile communication or entertainment device. The transmitter device 106 can also be a device, such as evolve Node B ("eNB"), a cellular radio station, a cell tower, a cellular routing device, a relay station, or other radio receiving devices. The transmitter device 106 can be a standalone device, or can be incorporated with a structure, for example a building, a vehicle, or a tower. The transmitter device 106 can couple to the communication channel 108 to communicate with the receiver device 104.

The transmitter device 106 can be centralized in a single computer room, distributed across different rooms, attached to a building, distributed across different geographical locations, embedded within a telecommunications network, or attached to a tower. The transmitter device 106 can have a means for coupling with the communication channel 108 to communicate with the receiver device 104. The transmitter device 106 can also be a mobile type device.

For illustrative purposes, the mobile telecommunication system 100 is described with the transmitter device 106 having a signal transmission function, although it is understood that the transmitter device 106 can also have a signal receiving function. For illustrative purposes, the mobile telecommunication system 100 is described with the receiver device 104 having a signal receiving function, although it is understood that the receiver device 104 can also have a signal transmission function.

Also for illustrative purposes, the mobile telecommunication system 100 is shown with the transmitter device 106 and the receiver device 104 as end points of the communication channel 108, although it is understood that the mobile telecommunication system 100 can have a different partition between the receiver device 104, the transmitter device 106, and the communication channel 108. For example, the receiver device 104, the transmitter device 106, or a combination thereof can also function as part of the communication channel 108.

The receiver device 104 can determine a received reference signal 110 from the communication channel 108. The received reference signal 110 is defined as the reference signal received from the transmitter device 106 through the communication channel 108 and determined at the receiver device 104. The received reference signal 110 can be a detected information at the receiver device 104 corresponding to the resource elements that carry cell-specific reference signals within the considered frequency bandwidth.

The transmitter device 106 can establish cells by broadcasting their respective cell selection reference signals, such as the received reference signal 110. The size of each cell can be defined by the size of an area in which the cell selection reference signal reaches at a predetermined power value. The receiver device 104 can establish a connection for communication with the transmitter device 106 from which it can receive the cell selection reference signal, preferably at maximum intensity.

The communication channel 108 from the transmitter device 106 to the receiver device 104 can include characteristics such as Gaussian noise, dispersion, path loss, shadow fading, fast fading, other interference or noise, or a combination thereof. These characteristics can cause the received reference signal 110 to be attenuated, phase-shifted, or delayed, resulting in decrease in the quality of the signal seen by the receiver device 104.

The transmitter device 106 can transmit a reference element count 112 of reference symbols 114 to the receiver device 104. The reference symbols 114 are defined as resource elements each corresponding to one complex-valued modulation symbol. The reference element count 112 is defined as the number of the reference symbols 114 in symbol duration 116 for transmission. The reference element count 112 can be the number of m-th cell specific reference signal (CRS) resource element (RE) in the symbol duration 116. The symbol duration 116 is defined as a unit time block for transmission from the transmitter device 106 to the receiver device 104. The symbol duration 116 can be an inverse to the symbol rate of the transmitter device 106.

The receiver device 104 can measure the radio link quality through the communication channel 108 from the transmitter device 106. The radio link quality can be generally represented as a form of a signal to noise ratio 118. The signal to noise ratio 118 can be, for example, a signal-to-interference-plus-noise ratio (SINR), a signal-to-noise ratio (SNR). In a system with multiple carriers such as OFDM, the signal to noise ratio 118 can also represent the carrier-to-noise ratio (CNR) or the carrier-to-interference-plus-noise ratio (CINR).

The signal to noise ratio 118 can be measured in either frequency domain or in time domain. The signal to noise ratio 118 can be measured with a channel impulse response (CIR) of the received reference signal 110 in time domain. The signal to noise ratio 118 can be the ratio of a received signal power 120 over a total noise variance 122. The total noise variance 122 is defined as the total variance of noise within the symbol duration 116. In an OFDM system, multiple frequency domain samples are assigned as the received reference signal 110. Hence, calculation of the received signal power 120 and the total noise variance 122 can be done in the time domain by taking an inverse fast Fourier transform (IFFT) on the received reference signal 110 in the symbol duration 116. The signal to noise ratio 118 can be averaged with an adaptive filter or an infinite impulse response filter.

The received signal power 120 is defined as received power based on a message sent from the transmitter device 106 for the symbol duration 116. The received signal power 120 can include the received power on specific resources such as reference symbols, pilot symbols, allocated data symbols, or a combination thereof. The total noise variance 122 can be calculated based on noise variance noise samples found throughout the symbol duration 116.

The transmitter device 106 can send the received reference signal 110 to the receiver device 104 for the purpose of measuring the signal to noise ratio 118. The received reference signal 110 can include multiple reference symbol elements and its spacing is related to the expected coherence bandwidth of the channel, which is in turn related to a delay spread. The receiver device 104 can calculate the signal to noise ratio 118 on the reference symbol elements of the received reference signal 110 in time domain.

The receiver device 104 can compute the received signal power 120 for processing symbols from the transmitter device 106 based on a total power 124 of the received reference signal 110 and the signal to noise ratio 118. The total power 124 is defined as total received power in the symbol duration 116 including noise, interference, and signal. For example, the receiver device 104 can compute the received signal power 120 based on the total power 124 minus the total noise variance 122. The receiver device 104 can combine the signal to noise ratio 118 in each of OFDM symbol, and utilize it as the mean/average SNR for decoding symbols from the received reference signal 110. The receiver device 104 can combine instances of the signal to noise ratio 118 computed per antenna on the receiver device 104, and use it to calculate the mean/average SNR.

The physical transformation of adjusting the receiver device 104 based on estimation of the signal to noise ratio 118 results in activations of displays, signal decoding hardware, or audio components in the receiver device 104 in the physical world. Further, as a result of the adjustment based on the signal to noise ratio 118, the mobile telecommunication system 100 will physically change the operation of its symbol decoding module, radio link management module, and the downlink quality reporting module. Based on the change of symbol decoding, radio link management, and downlink reporting, the voice and data quality heard and displayed on the receiver device 104 is changed. Thus, the quality and delay of the receiver device 104, such as a mobile device output, can change and improve based on those adjustments due to accurate estimation of the signal to noise ratio 118 by the mobile telecommunication system 100.

Figure 2:
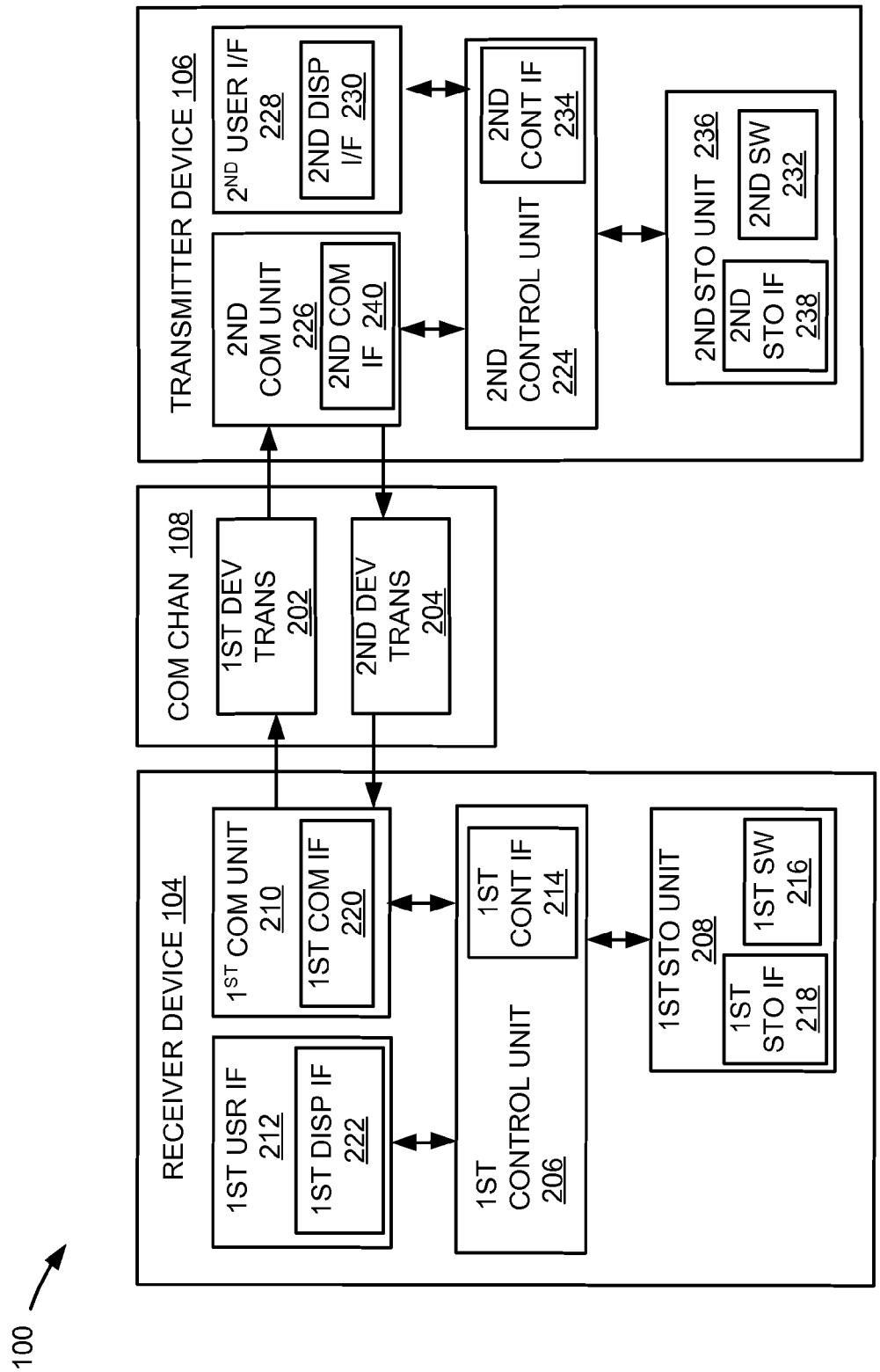
FIG. 2 is an exemplary block diagram of the mobile telecommunication system.

Referring now to FIG. 2, therein is shown an exemplary block diagram of the mobile telecommunication system 100. The receiver device 104 can send information in a first device transmission 202 over the communication channel 108 to the transmitter device 106 of FIG. 1. The receiver device 104 can receive information in a second device transmission 204 over the communication channel 108 from the transmitter device 106.

The receiver device 104 can include a first control unit 206, a first storage unit 208, a first communication unit 210, and a first user interface 212. The first control unit 206 can include a first control interface 214. The first control unit 206 can execute a first software 216 to provide the intelligence of the mobile telecommunication system 100. The first control unit 206 can be implemented in a number of different manners. For example, the first control unit 206 can be a processor, an embedded processor, a microprocessor, a hardware control logic, a hardware finite state machine (FSM), a digital signal processor (DSP), or a combination thereof. The first control interface 214 can be used for communication between the first control unit 206 and other functional units in the receiver device 104. The first control interface 214 can also be used for communication that is physically separated from the receiver device 104.

The first control interface 214 can receive information from the other functional units or from external sources, or can transmit information to the other functional units or to external destinations. The external sources and the external destinations refer to sources and destinations physically separated from the receiver device 104.

The first control interface 214 can be implemented in different ways and can include different implementations depending on which functional units or external units are being interfaced with the first control interface 214. For example, the first control interface 214 can be implemented with a pressure sensor, an inertial sensor, a microelectromechanical system (MEMS), optical circuitry, waveguides, wireless circuitry, wireline circuitry, or a combination thereof.

The first storage unit 208 can store the first software 216. The first storage unit 208 can also store the relevant information, such as advertisements, points of interest (POI), navigation routing entries, or any combination thereof.

The first storage unit 208 can be a volatile memory, a nonvolatile memory, an internal memory, an external memory, or a combination thereof. For example, the first storage unit 208 can be a nonvolatile storage such as non-volatile random access memory (NVRAM), Flash memory, disk storage, or a volatile storage such as static random access memory (SRAM).

The first storage unit 208 can include a first storage interface 218. The first storage interface 218 can be used for communication between the first storage unit 208 and other functional units in the receiver device 104. The first storage interface 218 can be used for communication that is external to the receiver device 104.

The first storage interface 218 can receive information from the other functional units or from external sources, or can transmit information to the other functional units or to external destinations. The external sources and the external destinations refer to sources and destinations physically separated from the receiver device 104.

The first storage interface 218 can include different implementations depending on which functional units or external units are being interfaced with the first storage unit 208. The first storage interface 218 can be implemented with technologies and techniques similar to the implementation of the first control interface 214.

The first communication unit 210 can enable external communication to and from the receiver device 104. For example, the first communication unit 210 can permit the receiver device 104 to communicate with the transmitter device 106 of FIG. 1, such as a peripheral device or a computer desktop, and the communication channel 108.

The first communication unit 210 can also function as a communication hub allowing the receiver device 104 to function as part of the communication channel 108 and not limited to be an end point or terminal unit to the communication channel 108. The first communication unit 210 can include active and passive components, such as microelectronics or an antenna, for interaction with the communication channel 108.

The first communication unit 210 can include a first communication interface 220. The first communication interface 220 can be used for communication between the first communication unit 210 and other functional units in the receiver device 104. The first communication interface 220 can receive information from the other functional units or can transmit information to the other functional units.

The first communication interface 220 can include different implementations depending on which functional units are being interfaced with the first communication unit 210. The first communication interface 220 can be implemented with technologies and techniques similar to the implementation of the first control interface 214.

The first user interface 212 allows a user (not shown) to interface and interact with the receiver device 104. The first user interface 212 can include an input device and an output device. Examples of the input device of the first user interface 212 can include a keypad, a touchpad, soft-keys, a keyboard, a microphone, or any combination thereof to provide data and communication inputs.

The first user interface 212 can include a first display interface 222. The first display interface 222 can include a display, a projector, a video screen, a speaker, or any combination thereof.

The first control unit 206 can operate the first user interface 212 to display information generated by the mobile telecommunication system 100. The first control unit 206 can also execute the first software 216 for the other functions of the mobile telecommunication system 100. The first control unit 206 can further execute the first software 216 for interaction with the communication channel 108 via the first communication unit 210.

The transmitter device 106 can be optimized for implementing the present invention in a multiple device embodiment with the receiver device 104. The transmitter device 106 can provide the additional or higher performance processing power compared to the receiver device 104. The transmitter device 106 can include a second control unit 224, a second communication unit 226, and a second user interface 228.

The second user interface 228 allows a user (not shown) to interface and interact with the transmitter device 106. The second user interface 228 can include an input device and an output device. Examples of the input device of the second user interface 228 can include a keypad, a touchpad, soft-keys, a keyboard, a microphone, or any combination thereof to provide data and communication inputs. Examples of the output device of the second user interface 228 can include a second display interface 230. The second display interface 230 can include a display, a projector, a video screen, a speaker, or any combination thereof.

The second control unit 224 can execute a second software 232 to provide the intelligence of the transmitter device 106 of the mobile telecommunication system 100. The second software 232 can operate in conjunction with the first software 216. The second control unit 224 can provide additional performance compared to the first control unit 206.

The second control unit 224 can operate the second user interface 228 to display information. The second control unit 224 can also execute the second software 232 for the other functions of the mobile telecommunication system 100, including operating the second communication unit 226 to communicate with the receiver device 104 over the communication channel 108.

The second control unit 224 can be implemented in a number of different manners. For example, the second control unit 224 can be a processor, an embedded processor, a microprocessor, a hardware control logic, a hardware finite state machine (FSM), a digital signal processor (DSP), or a combination thereof.

The second control unit 224 can include a second control interface 234. The second control interface 234 can be used for communication between the second control unit 224 and other functional units in the transmitter device 106. The second control interface 234 can also be used for communication that is external to the transmitter device 106.

The second control interface 234 can receive information from the other functional units or from external sources, or can transmit information to the other functional units or to external destinations. The external sources and the external destinations refer to sources and destinations physically separate from the transmitter device 106.

The second control interface 234 can be implemented in different ways and can include different implementations depending on which functional units or external units are being interfaced with the second control interface 234. For example, the second control interface 234 can be implemented with a pressure sensor, an inertial sensor, a microelectromechanical system (MEMS), optical circuitry, waveguides, wireless circuitry, wireline circuitry, or a combination thereof.

A second storage unit 236 can store the second software 232. The second storage unit 236 can also store the relevant information, such as advertisements, points of interest (POI), navigation routing entries, or any combination thereof. The second storage unit 236 can be sized to provide the additional storage capacity to supplement the first storage unit 208.

For illustrative purposes, the second storage unit 236 is shown as a single element, although it is understood that the second storage unit 236 can be a distribution of storage elements. Also for illustrative purposes, the mobile telecommunication system 100 is shown with the second storage unit 236 as a single hierarchy storage system, although it is understood that the mobile telecommunication system 100 can have the second storage unit 236 in a different configuration. For example, the second storage unit 236 can be formed with different storage technologies forming a memory hierarchal system including different levels of caching, main memory, rotating media, or off-line storage.

The second storage unit 236 can be a volatile memory, a nonvolatile memory, an internal memory, an external memory, or a combination thereof. For example, the second storage unit 236 can be a nonvolatile storage such as non-volatile random access memory (NVRAM), Flash memory, disk storage, or a volatile storage such as static random access memory (SRAM).

The second storage unit 236 can include a second storage interface 238. The second storage interface 238 can be used for communication between the second storage unit 236 and other functional units in the transmitter device 106. The second storage interface 238 can be used for communication that is external to the transmitter device 106.

The second storage interface 238 can receive information from the other functional units or from external sources, or can transmit information to the other functional units or to external destinations. The external sources and the external destinations refer to sources and destinations physically separate from the transmitter device 106.

The second storage interface 238 can include different implementations depending on which functional units or external units are being interfaced with the second storage unit 236. The second storage interface 238 can be implemented with technologies and techniques similar to the implementation of the second control interface 234.

The second communication unit 226 can enable external communication to and from the transmitter device 106. For example, the second communication unit 226 can permit the transmitter device 106 to communicate with the receiver device 104 over the communication channel 108.

The second communication unit 226 can also function as a communication hub allowing the transmitter device 106 to function as part of the communication channel 108 and not limited to be an end point or terminal unit to the communication channel 108. The second communication unit 226 can include active and passive components, such as microelectronics or an antenna, for interaction with the communication channel 108.

The second communication unit 226 can include a second communication interface 240. The second communication interface 240 can be used for communication between the second communication unit 226 and other functional units in the transmitter device 106. The second communication interface 240 can receive information from the other functional units or can transmit information to the other functional units.

The second communication interface 240 can include different implementations depending on which functional units are being interfaced with the second communication unit 226. The second communication interface 240 can be implemented with technologies and techniques similar to the implementation of the second control interface 234.

The first communication unit 210 can couple with the communication channel 108 to send information to the transmitter device 106 in the first device transmission 202. The transmitter device 106 can receive information in the second communication unit 226 from the first device transmission 202 of the communication channel 108.

The second communication unit 226 can couple with the communication channel 108 to send information to the receiver device 104 in the second device transmission 204. The receiver device 104 can receive information in the first communication unit 210 from the second device transmission 204 of the communication channel 108. The mobile telecommunication system 100 can be executed by the first control unit 206, the second control unit 224, or a combination thereof.

For illustrative purposes, the transmitter device 106 is shown with the partition having the second user interface 228, the second storage unit 236, the second control unit 224, and the second communication unit 226, although it is understood that the transmitter device 106 can have a different partition. For example, the second software 232 can be partitioned differently such that some or all of its function can be in the second control unit 224 and the second communication unit 226. Also, the transmitter device 106 can include other functional units not shown in FIG. 2 for clarity.

The functional units in the receiver device 104 can work individually and independently of the other functional units. The receiver device 104 can work individually and independently from the transmitter device 106 and the communication channel 108.

The functional units in the transmitter device 106 can work individually and independently of the other functional units. The transmitter device 106 can work individually and independently from the receiver device 104 and the communication channel 108.

For illustrative purposes, the mobile telecommunication system 100 is described by operation of the receiver device 104 and the transmitter device 106. It is understood that the receiver device 104 and the transmitter device 106 can operate any of the modules and functions of the mobile telecommunication system 100. For example, the receiver device 104 is described to operate the first communication unit 210, although it is understood that the transmitter device 106 can also operate the first communication unit 210.

Figure 3:
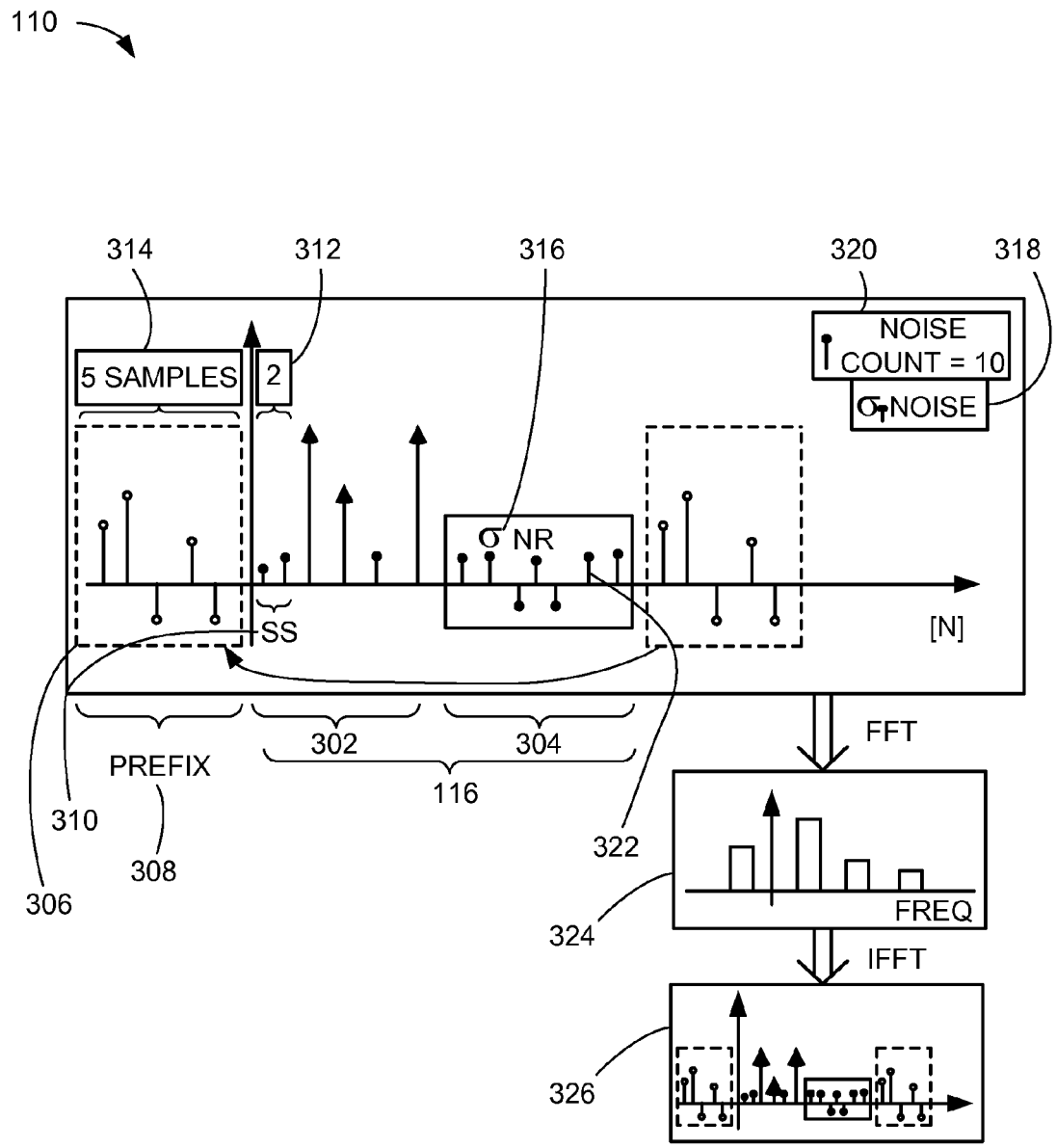
FIG. 3 is an example of the received reference signal from a channel impulse response measured by the receiver device of FIG. 1.

Referring now to FIG. 3, therein is shown an example of the received reference signal 110 from a channel impulse response measured by the receiver device 104 of FIG. 1. The received reference signal 110 can include intervals of the symbol duration 116. The symbol rate can be measured as a subcarrier spacing of the received reference signal 110 in frequency domain. The symbol duration 116 can include a signal region 302, and a noise region 304. The symbol duration 116 can be surrounded by a guard portion 306.

The guard portion 306 is defined as a portion of the received reference signal 110 for ensuring distinct transmissions in the received reference signal 110 do not interfere with one another and for introducing resistance or immunity to propagation delays, echoes, and reflections. The guard portion 306 can be between transmitted pulses in time domain. The guard portion 306 can be removed in frequency domain as described in FIG. 4.

A cyclic prefix 308 can be a form of the guard portion 306. The cyclic prefix 308 can be part of the guard portion 306. The cyclic prefix 308 is defined as a portion of the received reference signal 110 before a symbol that is a repetition of the end of the symbol. The cyclic prefix 308 can allow the linear convolution of a frequency-selective multipath channel to be modeled as circular convolution, which in turn may transform to the frequency domain using a discrete Fourier domain. The cyclic prefix 308 can be for eliminating inter-symbol interference and for channel estimation and equalization.

The signal region 302 is defined as a time duration of the received reference signal 110 during which a transmitted pulse of symbol or symbols and its multipath components are received. The signal region 302 can be a time duration of the received reference signal 110 during which a channel impulse and its multipath components are received. The signal region 302 can have a duration equal to the duration of the cyclic prefix 308 or double the duration of the cyclic prefix 308.

The signal region 302 can also include shifted samples 310. Because the mobile telecommunication system 100 may zero-pad the channel impulse response in frequency domain, the received signal power 120 of FIG. 1 can spread in time domain. The received signal power 120 can also have a sync-like shape due to windowing or zero-padding.

Some of the received signal power 120 can leak outside an interval of time more than the duration of the cyclic prefix 308. The shifted samples 310 is defined as last time domain samples in the symbol duration 116 that are circularly shifted to the beginning of the symbol duration 116. A shift size 312 is defined as the size of the shifted samples 310. A prefix sample size 314 is defined as the sample size of the cyclic prefix 308. For example, the signal region 302 can have a duration equal to the prefix sample size 314 plus the shift size 312.

Noise is a characteristic of the communication channel 108 of FIG. 1, and hence is throughout the received reference signal 110. The received reference signal 110 can include the noise region 304 in time domain, where the transmitter device 106 of FIG. 1 has not encoded any signal symbol in the region and where the received reference signal 110 includes only noise, interference, or both noise and interference. The noise region 304 and the signal region 302 can be separated by data segmentation mechanisms, including thresholding by a power or voltage amplitude, peak counting, or comparing the average power of intervals within the symbol duration 116. The noise region 304 can be identified by taking the symbol duration 116 minus a time interval equal to the duration of the cyclic prefix 308 and the duration of the shifted samples 310.

Most of the received signal power 120 can be in the first half of the symbol duration 116, mainly within a time interval equal to the duration of the cyclic prefix 308. Noise of the communication channel 108 can be in the entirety of the symbol duration 116. The total noise variance 122 of FIG. 1 can be estimated by calculating a noise region variance 316 in the noise region 304 or a noise variance estimate 318 in both the noise region 304 and the signal region 302.

The noise region variance 316 is a calculated variance of noise samples in the noise region 304. The noise variance estimate 318 is a calculated variance of noise samples, which can be in the noise region 304, the signal region 302, or both. The total noise variance 122 can be estimated as a summation of the absolute square value of all noise samples in the signal region 302 and the noise region 304 multiplied by a scaling factor of total number of samples in the symbol duration 116 divided by number of noise samples in the noise region 304 and the signal region 302.

The symbol duration 116 can include a noise sample size 320 of instances of a noise sample 322. The noise sample 322 is defined as a discrete noise sample in the symbol duration 116 in time domain which contains only noise, interference, or a combination thereof. While the signal region 302 contains reference symbols, the signal region 302 can also contain the noise sample 322. The noise sample 322 can be noise symbols within the signal region 302 received as a characteristic of the communication channel 108. The noise sample size 320 is defined as the number of the instances of the noise sample 322 in the symbol duration 116.

The received reference signal 110 can be represented in frequency domain, such as by a Fourier transform 324. The Fourier transform 324 is defined as a collection of discrete frequencies and corresponding amplitudes to those frequencies.

The received reference signal 110 can be converted back to time domain following a frequency domain operation by an inverse Fourier transform 326. The inverse Fourier transform 326 is defined as a discrete time domain representation of a discrete Fourier transform. The size of the inverse Fourier transform 326 can be a number that is an order of 2, where the size is greater than the number of reference symbol elements. The size of the inverse Fourier transform 326 can be an order of 2 just above the number of reference symbol elements, or any order of 2 above the number of reference symbol elements.

Figure 4:
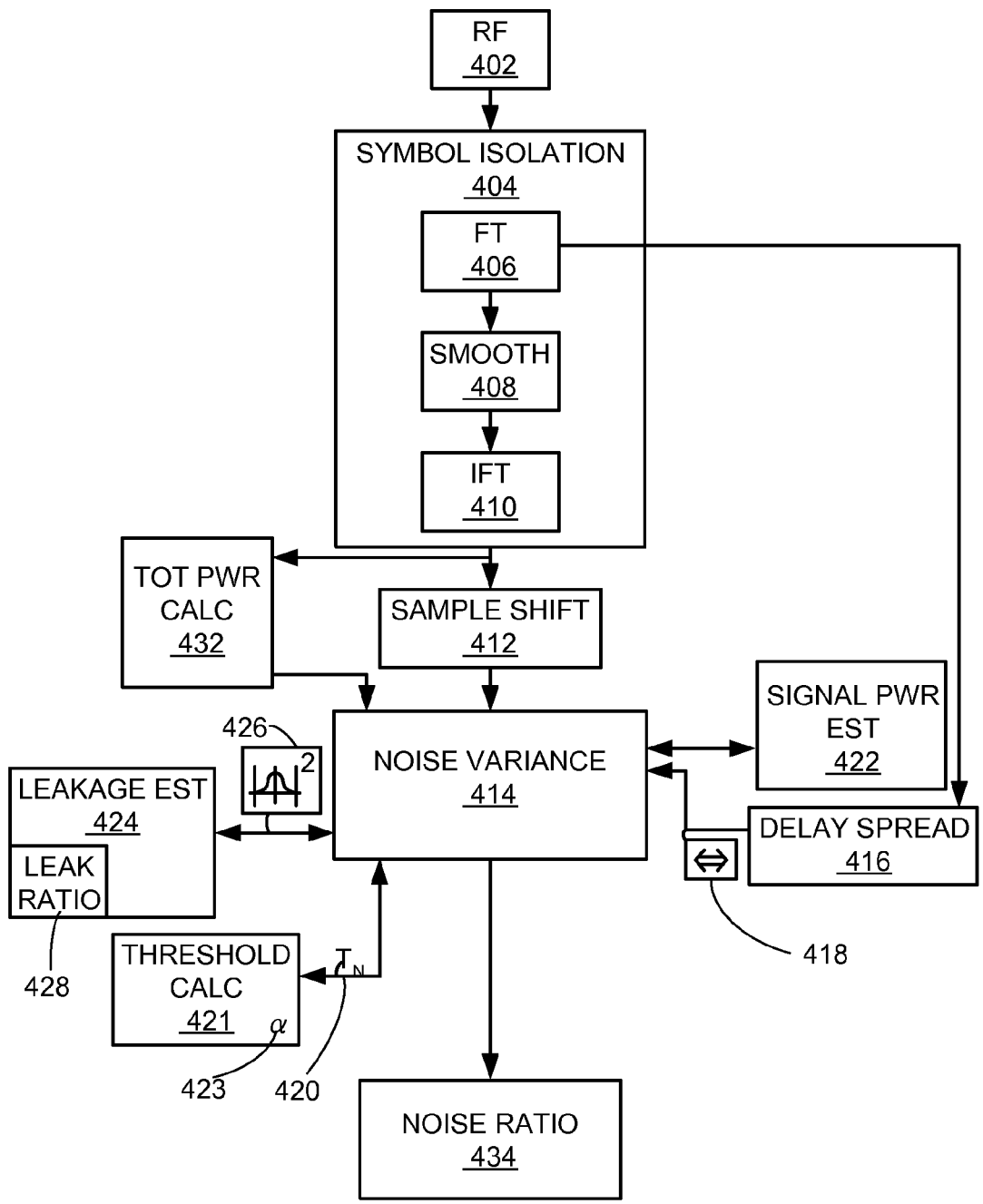
FIG. 4 is a control flow of the mobile telecommunication system.

Referring now to FIG. 4, therein is shown a control flow of the mobile telecommunication system 100. The mobile telecommunication system 100 can include a radio frequency module 402. The radio frequency module 402 is for receiving and measuring radio waves from at least one antenna. The radio frequency module 402 can receive and output the received reference signal 110 of FIG. 1 for other modules of the mobile telecommunication system 100 to process. The radio frequency module 402 can measure the received reference signal 110 at the receiver device 104.

The mobile telecommunication system 100 can include a symbol isolation module 404. The symbol isolation module 404 can be coupled with the radio frequency module 402 to receive the received reference signal 110 from the radio frequency module 402. The symbol isolation module 404 is for isolating the symbol duration 116 of FIG. 1 from the received reference signal 110. The symbol isolation module 404 can isolate the symbol duration 116 by removing the guard portion 306 of FIG. 3 of the received reference signal 110 or removing the cyclic prefix 308 of FIG. 3 of the received reference signal 110. The symbol isolation module 404 can isolate the symbol duration 116 in time domain or in frequency domain.

The symbol isolation module 404 can include a Fourier transform module 406. The Fourier transform module 406 is for calculating the Fourier transform 324 of FIG. 3 of the received reference signal 110 by performing a discrete Fourier transformation on the received reference signal 110. The Fourier transform module 406 can also be for removing the guard portion 306 from the received reference signal 110. The Fourier transform module 406 can remove the guard portion 306 from the received reference signal 110 including removing the cyclic prefix 308 from the received reference signal 110. The Fourier transform module 406 can remove the guard portion 306 in the Fourier transform 324 of the received reference signal 110. The Fourier transform module 406 can calculate a flat-fading channel frequency response.

The symbol isolation module 404 can include a smooth module 408. The smooth module 408 can be coupled to the Fourier transform module 406 to receive the Fourier transform 324 from the Fourier transform module 406. The smooth module 408 is for smoothing the received reference signal 110 for preventing fading of the received reference signal 110. The smooth module 408 can smooth the received reference signal 110 by zero-padding the Fourier transform 324 of the received reference signal 110 for non-symbol frequencies.

The smooth module 408 can smooth the received reference signal 110 by windowing the received reference signal 110, such as a band-pass filter, a rectangular window function, a Hann window, a Hamming window, a Raised-Cosine window, an apodization function, or other windowing function. The smooth module 408 can smooth the received reference signal 110 by interpolation. For example, the smooth module 408 can insert samples between reference symbol elements in the Fourier transform 324, where the magnitude of the inserted samples is an average of the neighboring reference symbol elements.

For example, when rectangular windowing is applied, the noise region 304 of FIG. 3 and the signal region 302 of FIG. 3 can be fixed. As a specific example, the noise region 304 and the signal region 302 can be segregated based on the longest channel delay profile that the receiver device 104 of FIG. 1 can support. For another example, when non-rectangular windowing is applied, the noise region 304 can be widened from the fixed size because signal leakage to the noise region 304 can be significantly reduced.

The symbol isolation module 404 can include an inverse Fourier module 410. The inverse Fourier module 410 can be coupled to the smooth module 408 to receive the Fourier transform 324 after processing by the smooth module 408. The inverse Fourier module 410 is for calculating the inverse Fourier transform 326 of FIG. 3 from the Fourier transform 324 of the received reference signal 110. The inverse Fourier module 410 can calculate the inverse Fourier transform 326 from the Fourier transform 324 with the guard portion 306 removed. By taking the inverse Fourier transform of the Fourier transform 324, the inverse. Fourier module 410 can determine the channel impulse response in time domain. The received reference signal 110 can be interpolated in time domain after the inverse Fourier transform 326 is calculated, where samples of the inverse Fourier transform 326 that is not a reference symbol element can be estimated as an average between the neighboring reference symbol elements.

The mobile telecommunication system 100 can include a sample shift module 412. The sample shift module 412 can be coupled to the symbol isolation module 404 to receive the inverse Fourier transform 326 of FIG. 3 of the received reference signal 110 with the guard portion 306 removed. The sample shift module 412 is for circular shifting samples in the inverse Fourier transform 326 of the received reference signal 110 within the symbol duration 116. The sample shift module 412 can move the shifted samples 310 of FIG. 3 from an end portion of the inverse Fourier transform 326 to a beginning portion of the inverse Fourier transform 326.

The mobile telecommunication system 100 can include a noise variance module 414. The noise variance module 414 can be coupled to the symbol isolation module 404 to receive the inverse Fourier transform 326 of the received reference signal 110. The noise variance module 414 can be coupled to the sample shift module 412 to receive the inverse Fourier transform 326 of the received reference signal 110 after circular shifting the shifted samples 310. The noise variance module 414 is for determining or estimating the noise variance estimate 318 of FIG. 3 of the received reference signal 110. The noise variance estimate 318 can be estimated with the channel impulse response in time domain.

The noise variance module 414 can calculate the noise region variance 316 of FIG. 3 from the noise region 304. The noise variance module 414 can output the noise region variance 316 as the noise variance estimate 318. The noise variance module 414 can also calculate the noise variance estimate 318 from at least the noise sample 322 of FIG. 3 of the signal region 302. The noise variance module 414 can calculate the noise variance estimate 318 from both instances of the noise sample 322 and the noise region variance 316.

It has been discovered that the mobile telecommunication system 100 with determining the noise variance estimate 318 from both the noise region 304 and the signal region 302 can allow for estimation of the signal to noise ratio 118 of FIG. 1 aimed at low SNR region. When the signal to noise ratio or the carrier to interference ratio is low, the noise variance can be more accurately estimated by sampling both the signal region 302 and the noise region 304 of the symbol duration 116.

The mobile telecommunication system 100 can include a delay spread module 416. The delay spread module 416 can be coupled to the Fourier transform module 406 to receive the Fourier transform 324 of the received reference signal 110. The delay spread module 416 is for calculating a delay spread estimate 418 of the received reference signal 110. The received reference signal 110 transmitted through the communication channel 108 of FIG. 1 can have the delay spread estimate 418. The delay spread estimate 418 can be caused by channel characteristics, such as multi-path richness of the received reference signal 110. The delay spread estimate 418 is defined as a measure of the multipath richness of the communication channel 108. For example, the delay spread estimate 418 can represent the difference between the time of arrival of the earliest significant multipath component and the time of arrival of the latest multipath component. The delay spread estimate 418 can be quantified through different metrics, including the root mean square delay spread.

The noise variance module 414 can use side information on the delay spread estimate 418 to enhance estimation quality of the noise region variance 316. The delay spread module 416 can calculate the delay spread estimate 418, such as a root-mean square (RMS) delay spread.

The noise variance module 414 can size the noise region 304 relative to the signal region 302 and vice versa based on the delay spread estimate 418. With the sample sizes of the noise region 304 adjusted, the receiver device 104 can add more samples for estimation of the noise region variance 316 or the noise variance estimate 318. Further, if the position of the signal multipath can be measured precisely, the receiver device 104 can filter with a noise threshold 420 to determine the noise sample 322 in the signal region 302 that is not from the multipath including the sidelobes.

The mobile telecommunication system 100 can include a threshold calculation module 421. The threshold calculation module 421 can couple with the noise variance module 414. The threshold calculation module 421 is for determining the noise threshold 420. The threshold calculation module 421 can determine the noise threshold 420 for collecting more noise samples from the signal region 302 received through the noise variance module 414. The noise threshold 420 can be for calculating the noise variance estimate 318. The threshold calculation module 421 can select the noise threshold 420 based on Equation 1:

$$P_{th} = \alpha * \sigma_{N0} \qquad \text{Eq. 1}$$

Here, $P_{th}$ represents the noise threshold 420. $\sigma_{N0}$ represents square root of the noise region variance 316. $\alpha$ represents a channel dependent scaling factor 423. The channel dependent scaling factor 423 can be determined through measurement of the delay spread of the communication channel 108. The channel dependent scaling factor 423 can be user-defined or can be a stored variable on the receiver device 104. The channel dependent scaling factor 423 can be received from the transmitter device 106.

The channel dependent scaling factor 423 can be estimated based on the delay profile of the communication channel 108. Different instances of the noise threshold 420 can be calculated for each channel delay profile depending on the communication channel 108 used. The channel dependent scaling factor 423 can be calculated based on the delay spread estimate 418 from the delay spread module 416.

The threshold calculation module 421 can select the noise threshold 420 to satisfy Equation 2, as follows:

$$|rm(tTs)| < P_{th} \qquad \text{Eq. 2}$$

Here, rm(tTs) represents each potential instance of the noise sample 322 in the signal region 302, where "Ts" represents a sampling interval of the inverse Fourier transform 326 and "t" represents a count of the multiples of the sampling interval. The symbols in the signal region 302 follow a normal distribution, and hence the absolute value of each symbol is a random variable that follows a Rayleigh distribution. In Rayleigh distribution, the probability density functions ("pdfs") with different variances are distinguishable from each other based on their magnitude. Hence, if the variance of the received signal power 120 of FIG. 1 is not negligible compared to the noise variance estimate 318, the noise threshold 420 selected by the threshold calculation module 421 can distinguish the noise sample 322 from the shifted samples 310.

The noise variance module 414 can include the noise sample 322 from the signal region 302 for calculating the noise variance estimate 318 when an absolute value of the noise sample 322 is smaller than the noise threshold 420. The addition of the noise sample 322 can be included for calculation of the noise variance estimate 318. In the signal region 302, which can include time interval of the cyclic prefix 308 and time interval of the shifted samples 310, the received reference signal 110 can be distributed as a normal distribution with the variance equal to the noise variance estimate 318 plus the signal power variance. The noise threshold 420 can add all instances of the noise sample 322 from the signal region 302 together with all sample points in the noise region 304 to calculate the noise variance estimate 318.

When more instances of the noise sample 322 are detected in the signal region 302, the noise variance estimate 318 can be updated based on all instances of the noise sample 322 in the noise region 304 and instances of the noise sample 322 in the signal region 302 below the noise threshold 420. The total noise variance 122 can be calculated by the noise variance estimate 318 multiplied by a scaling factor of number of samples in the symbol duration 116 over the noise sample size 320 of FIG. 3. For example, here the noise sample size 320 can be equal to the size of the Fourier transform 324 minus both the shift size 312 of FIG. 3 and the prefix sample size 314, and plus the number of the noise sample 322 in the signal region 302 detected via thresholding with the noise threshold 420. The noise sample size 320 can also be the number of the noise sample 322 in the noise region 304 plus the number of the noise sample 322 in the signal region 302.

As new instances of the noise sample 322 are detected in the signal region 302, the noise variance estimate 318 can be updated recursively. As the noise variance estimate 318 is updated recursively, the noise threshold 420 can also be updated recursively such that the noise threshold 420 is updated as the channel dependent scaling factor multiplied by the noise variance estimate 318 that is updated.

It has been discovered that selecting the noise threshold 420 based on the noise region variance 316 can accurately increase the quality of the noise variance estimate 318. For example, the variance of the estimation can improve as high as 1 dB in low SNR regions. Noise symbols converge in distribution, and hence more noise symbols need to be computed to increase the quality of the noise variance estimate 318. Selecting the noise threshold 420 based on the noise region variance 316 allow the noise variance module 414 to segregate out the noise sample 322 in the signal region 302 because the samples in the signal region 302 can follow Rayleigh distributions. Rayleigh distributions can be separated by its difference in variances by a magnitude threshold. Accordingly, selecting the noise threshold 420 based on the noise region variance 316 can accurately increase the quality of the noise variance estimate 318.

It has been discovered that by adding the noise sample 322 in the signal region 302 based on the noise threshold 420 for calculation of the noise variance estimate 318 can improve the audio quality and data link speed of the receiver device 102. Increased noise variance estimation quality increases the accuracy of the signal to noise ratio 118, and hence improves radio link management, and allows users to have faster and higher quality voice and Internet communication.

The mobile telecommunication system 100 can include a signal power estimation module 422. The signal power estimation module 422 can be coupled to the noise variance module 414. The signal power estimation module 422 is for calculating the received signal power 120 in the signal region 302 of the received reference signal 110. The signal power estimation module 422 can calculate the received signal power 120 in the signal region 302 based on the noise variance estimate 318 or the noise region variance 316 calculated by the noise variance module 414. The signal power estimation module 422 can calculate the received signal power 120 in the signal region 302 based on Equation 3, as follows:

$$\hat{P}_{signal} = \sum_{n=1}^{N_{CP}+N_{SS}} |r_k[n]|^2 - (N_{CP} + N_{SS})\hat{\sigma}^2_{NVT} \qquad \text{Eq. 3}$$

In Equation 3, $N_{CP}$ represents the prefix sample size 314. $N_{SS}$ represents the shift size 312. $r_k[n]$ represents discrete measures of the received signal power 120 based on the inverse Fourier transform 326. $\hat{P}_{signal}$ represents the received signal power 120. $\hat{\sigma}^2_{NVT}$ represents the noise variance estimate 318 divided by the noise sample size 320. In Equation 3, the noise variance estimate 318 can be equal to the noise region variance 316.

The mobile telecommunication system 100 can include a leakage estimation module 424. The leakage estimation module 424 can be coupled to the noise variance module 414, the signal power estimation module 422 (not shown), and the sample shift module 412 (not shown). The leakage estimation module 424 can receive the received signal power 120 from the noise variance module 414 or directly from the signal power estimation module 422.

The leakage estimation module 424 is for estimating a dispersion power 426 of the received signal power 120. The leakage estimation module 424 can estimate the dispersion power 426 based on the received signal power 120 from the signal power estimation module 422. The dispersion power 426 can be based on a leakage ratio 428 multiplied by the received signal power 120, as shown in Equation 4, as follows:

$$\hat{P}_{leakage} = P_{LSR} \cdot \hat{P}_{signal} \qquad \text{Eq. 4}$$

In Equation 4, $P_{LSR}$ represents the leakage ratio 428. $\hat{P}_{signal}$ represents the received signal power 120. $\hat{P}_{leakage}$ represents the dispersion power 426.

The leakage ratio 428 is defined as the signal power leakage to signal ratio, a ratio of the signal dispersion power to the non-dispersed signal power. The leakage ratio 428 can be calculated from the non-dispersed signal power. The leakage ratio 428 can be represented as Equation 5:

$$P_{LSR} \triangleq \frac{P_{leakage}}{P_{signal}} = \frac{\sum_{n=N_{CP}+N_{SS}+1}^{N_{fft}} |r_{signal}[n]|^2}{\sum_{n=1}^{N_{CP}+N_{SS}} |r_{signal}[n]|^2}$$

$$= \frac{\sum_{n=N_{CP}+N_{SS}+1}^{N_{fft}} \left|\frac{\sin\left(\pi\frac{nN_{CRS-RE}}{N_{fft}}\right)}{\sin\left(\pi\frac{n}{N_{fft}}\right)}\right|^2}{\sum_{n=1}^{N_{CP}+N_{SS}} \left|\frac{\sin\left(\pi\frac{nN_{CRS-RE}}{N_{fft}}\right)}{\sin\left(\pi\frac{n}{N_{fft}}\right)}\right|^2} \qquad \text{Eq. 5}$$

Equation 5 can be simplified to Equation 6, as follows:

$$P_{LSR} = \frac{N_{fft}}{N_{fft} - N_{CP} - N_{SS}} \sum_{n=N_{CP}+N_{SS}+1}^{N_{fft}} |r_{signal}[n]|^2 \cdot \frac{N_{fft}}{N_{CRS-RE}} \qquad \text{Eq. 6}$$

In Equations 5 and 6, $P_{LSR}$ represents the leakage ratio 428. $N_{CP}$ represents the prefix sample size 314. $N_{SS}$ represents the shift size 312. $N_{fft}$ represents the size of the Fourier transform 324. $N_{CRS-RE}$ represents the number of the reference element count 112 of FIG. 1. rsignal represents discrete measures of the received signal power 120 based on the inverse Fourier transform 326.

The leakage ratio 428 can also be computed offline based on the prefix sample size 314 and the shift size 312 with a pre-defined $N_{CRS-RE}$ For example, the leakage ratio 428 can be looked up in a table. Table 1 exemplifies a lookup table for the leakage ratio 428 based on the reference element count 112, the shift size 312, and the prefix sample size 314. The reference element count 112 is proportional to the system bandwidth as exemplified in Table 1. For example, Table 1 can be computed at 10 MHz bandwidth.

TABLE 1

| | Leakage ratio 428 Lookup Table | | | |
|---|---|---|---|---|
| System | ($N_{CP}/N_{fft}$, $N_{SS}/N_{fft}$) | | | |
| Bandwidth | (1/8, 1/8) | (1/4, 1/8) | (1/8, 1/4) | (1/4, 1/4) |
| 1.4 MHz | 0.0894 | 0.0604 | 0.0889 | 0.0526 |
| 3 MHz | 0.0424 | 0.0350 | 0.0360 | 0.0265 |
| 5 MHz | 0.0208 | 0.0174 | 0.0177 | 0.0127 |
| 10 MHz | 0.0103 | 0.0085 | 0.0089 | 0.0064 |
| 20 MHz | 0.0068 | 0.0058 | 0.0058 | 0.0042 |

The total noise variance 122 can be updated by subtracting the dispersion power 426 from the total noise variance 122 of FIG. 1. For example, the total noise variance 122 can be updated as Equation 7:

$$\hat{\sigma}^2_{SDC} = \frac{1}{N_{fft}}\left(N_{fft}\hat{\sigma}^2_{NVT} - \hat{P}_{leakage}\right) \qquad \text{Eq. 7}$$

In Equation 7, $N_{fft}$ represents the size of the Fourier transform 324. $\hat{P}_{leakage}$ represents the dispersion power 426. $\hat{\sigma}^2_{NVT}$ represents the noise variance estimate 318 divided by the noise sample size 320 before signal dispersion compensation. $\hat{\sigma}^2_{SDC}$ represents the total noise variance 112 after signal dispersion compensation divided by the size of the Fourier transform 324.

It has been unexpectedly discovered that compensating for signal dispersion through estimating the dispersion power 426 can increase the accuracy of the estimation of the signal to noise ratio 118. Signal dispersion term is the dominant factor that makes estimation of the signal to noise ratio 118 inaccurate in high carrier to noise region. In regions with high values of the signal to noise ratio 118, the noise variance estimate 318 can be asymptotically greater than the true noise variance due to signal dispersion. When the signal dispersion is compensated by subtracting the dispersion power 426 from the noise variance estimate 318, accuracy of estimating the total noise variance 122 is improved.

It has been unexpectedly discovered compensating the dispersion power 426 before calculating the signal to noise ratio 118 can eliminate the long-tailed signal power leakage over an entire OFDM symbol duration, which can be an artifact associated with zero-padding the Fourier transform 324 of the received reference signal 110.

The mobile telecommunication system 100 can include a total power calculation module 432. The total power calculation module 432 can be coupled to the symbol isolation module 404 to receive the inverse Fourier transform 326 of the received reference signal 110. The total power calculation module 432 is for calculating the total power 124 of FIG. 1 of the received reference signal 110. The total power calculation module 432 can calculate the total power 124 of the received reference signal 110 from the inverse Fourier transform 326 of the received reference signal 110. The total power 124 can be described as a weighted sum of the received signal power 120 and the total noise variance 122. For example, the total power calculation module 432 can calculate the total power 124 with Equation 8:

$$P_k = \sum_{n=1}^{N_{fft}} |r_k[n]|^2 \qquad \text{Eq. 8}$$

Here, $P_k$ represents the total power 124. $N_{fft}$ represents the total number of samples used to generate the Fourier transform 324 by the symbol isolation module 404. $r_k[n]$ represents the sample power for each sample in time domain of the inverse Fourier transform 326.

The mobile telecommunication system 100 can include a noise ratio module 434. The noise ratio module 434 can be coupled to the noise variance module 414 to receive the noise variance estimate 318. The noise ratio module 434 can be coupled to the total power calculation module 432 to receive the total power 124.

The noise ratio module 434 is for determining the signal to noise ratio 118 from the noise variance estimate 318. The noise ratio module 434 can calculate the signal to noise ratio 118 from the noise variance estimate 318 received from the noise variance module 414 and the total power 124 received from the total power calculation module 432. The noise ratio module 434 can calculate the signal to noise ratio 118 from the noise variance estimate 318 for adjusting the receiver device 104.

For example, the noise ratio module 434 can determine the signal to noise ratio 118 according to Equation 9:

$$\hat{\gamma}_k = \frac{P_k - N_{fft}\hat{\sigma}_k^2}{N_{fft}\hat{\sigma}_k^2} \qquad \text{Eq. 9}$$

Here, $P_k$ represents the total power 124. $N_{fft}$ represents the total number of samples used to generate the Fourier transform 324 by the symbol isolation module 404. $\hat{\sigma}_k^2$ represents the total noise variance 122 divided by $N_{fft}$. For example, $N_{fft}$ multiplied by $\hat{\sigma}_k^2$ would yield the total noise variance 122. $\hat{\gamma}_k$ represents the signal to noise ratio 118.

The physical transformation of adjusting the receiver device 104 based on estimation of the signal to noise ratio 118 results in activations of displays, signal decoding hardware, or audio components in the receiver device 104 in the physical world. Further, as a result of the adjustment based on the signal to noise ratio 118, the mobile telecommunication system 100 will physically change the operation of its symbol decoding module, radio link management module, and the downlink quality reporting module. Based on the change of symbol decoding, radio link management, and downlink reporting, the voice and data quality heard and displayed on the receiver device 104 is changed. Thus, the quality and delay of the receiver device 104, such as a mobile device output, can change and improve based on those adjustments due to accurate estimation of the signal to noise ratio 118 by the mobile telecommunication system 100.

The first software 216 of FIG. 2 of the receiver device 104 can include the modules of the mobile telecommunication system 100. For example, the first software 216 can include the radio frequency module 402, the symbol isolation module 404, the sample shift module 412, the noise variance module 414, the leakage estimation module 424, and the noise ratio module 434.

The first control unit 206 of FIG. 2 can execute the first software 216 for the radio frequency module 402 to process received reference signal 110 at the receiver device 104. The first control unit 206 can execute the first software 216 for the symbol isolation module 404 to remove the guard portion 306 from the received reference signal 110. The first control unit 206 can execute the first software 216 for the sample shift module 412 to circular-shift the received reference signal 110 by the shift size 312.

The first control unit 206 can execute the first software 216 for the leakage estimation module 424 for calculating the dispersion power 426 of the noise region 304 of the received reference signal 110. The first control unit 206 can execute the first software 216 for the noise variance module 414 to determine the noise variance estimate 318 from both the noise region 304 and the signal region 302 of the received reference signal 110 or to determine the noise variance estimate 318 based on at least the dispersion power 426. The first control unit 206 can execute the first software 216 for the noise ratio module 434 to calculate the signal to noise ratio 118 from the noise variance estimate 318 for adjusting the receiver device 104.

The second software 232 of FIG. 2 of the transmitter device 106 of FIG. 1 can include the modules of the mobile telecommunication system 100. For example, the second software 232 can include the radio frequency module 402, the symbol isolation module 404, the sample shift module 412, the noise variance module 414, the leakage estimation module 424, and the noise ratio module 434.

The second control unit 224 of FIG. 2 can execute the second software 232 for the radio frequency module 402 to process the received reference signal 110 at the receiver device 104. The second control unit 224 can execute the second software 232 for the symbol isolation module 404 to remove the guard portion 306 from the received reference signal 110. The second control unit 224 can execute the second software 232 for the sample shift module 412 to circular-shift the received reference signal 110 by the shift size 312.

The second control unit 224 can execute the second software 232 for the leakage estimation module 424 for calculating the dispersion power 426 of the noise region 304 of the received reference signal 110. The second control unit 224 can execute the second software 232 for the noise variance module 414 to determine the noise variance estimate 318 from both the noise region 304 and the signal region 302 of the received reference signal 110 or to determine the noise variance estimate 318 based on at least the dispersion power 426. The second control unit 224 can execute the second software 232 for the noise ratio module 434 to calculate the signal to noise ratio 118 from the noise variance estimate 318 for adjusting the receiver device 104.

The mobile telecommunication system 100 can be partitioned between the first software 216 and the second software 232. For example, the second software 232 can include the symbol isolation module 404, the sample shift module 412, the noise variance module 414, and the noise ratio module 434. The second control unit 224 can execute modules partitioned on the second software 232 as previously described.

The first software 216 can include the radio frequency module 402. Based on the size of the first storage unit 208, the first software 216 can include additional modules of the mobile telecommunication system 100. The first control unit 206 can execute the modules partitioned on the first software 216 as previously described.

The second control unit 224 can operate the second communication unit 226 of FIG. 2 to send the leakage ratio 428 to the receiver device 104. The first control unit 206 can operate the first communication unit 210 of FIG. 2 to do the same. The second communication unit 226 can send the leakage ratio 428 to the receiver device 104 through the communication channel 108 of FIG. 1.

The mobile telecommunication system 100 describes the module functions or order as an example. The modules can be partitioned differently. For example, the symbol isolation module 404 and the sample shift module 412 can be combined. Each of the modules can operate individually and independently of the other modules. Furthermore, data generated in one module can be used by another module without being directly coupled to each other.

Moreover, the modules described above can be implemented in hardware and should be considered as hardware functional units in addition to those described in FIG. 2, embedded into the functional units described in FIG. 2, or a combination thereof. For the purposes of this application, the modules are hardware implementation when claimed in apparatus claims.

The radio frequency module 402, the symbol isolation module 404, the Fourier transform module 406, the smooth module 408, the inverse Fourier module 410, the sample shift module 412, the noise variance module 414, the delay spread module 416, the signal power estimation module 422, the leakage estimation module 424, the threshold calculation module 421 the total power calculation module 432, and the noise ratio module 434 can be implement in as hardware (not shown) within the first control unit 206, the second control unit 224, or special hardware (not shown) in the receiver device 104 or the transmitter device 106.

Figure 5:
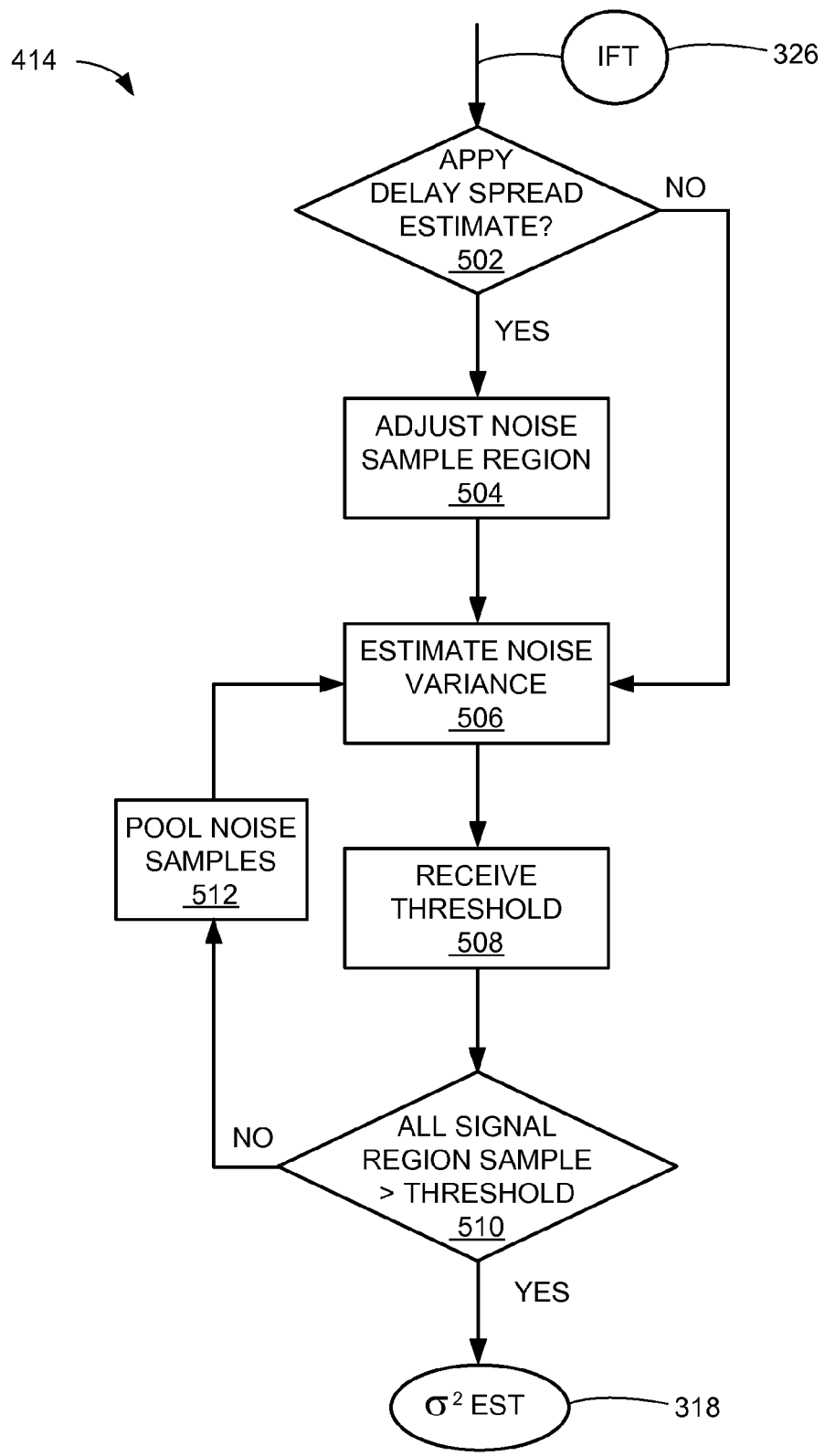
FIG. 5 is an example of a flow chart of the operation of the noise variance module.

Referring now to FIG. 5, therein is shown an example of a flow chart of the operation of the noise variance module 414. The noise variance module 414 can receive the inverse Fourier transform 326 of FIG. 3 from the sample shift module 412 of FIG. 4 after circular shifting the inverse Fourier transform 326. In a decision block 502, the noise variance module 414 can determine whether to apply an estimation of the delay spread estimate 418 of FIG. 4 received from the delay spread module 416 of FIG. 4. When the delay spread module 416 is applied, the noise variance module 414 can adjust temporal size of the noise region 304 of FIG. 3 or the signal region 302 of FIG. 3 based on the delay spread estimate 418 in a block 504. After the adjustment in the block 504 or when the delay spread module 416 is determined not to applied, the noise variance module 414 can estimate the noise variance estimate 318 of FIG. 3 in a block 506.

Once the noise variance estimate 318 has been estimated, the noise variance module 414 can receive the noise threshold 420 of FIG. 4 from the threshold calculation module 421 of FIG. 4 in a block 508. The noise variance module 414 can determine if any samples in the signal region 302 is less than the noise threshold 420 received from the threshold calculation module 421 in a block 510. Instances of the noise sample 322 of FIG. 3 in the signal region 302 are pooled together with samples in the noise region 304 in a block 512. The noise variance module 414 can estimate the noise variance estimate 318 once again in the block 506 with the combined samples from the block 512. If there are no more samples in the signal region 302 that is less than the noise threshold 420, the noise variance module 414 can output the noise variance estimate 318 for other modules of the mobile telecommunication system 100 to use. The block 510 and the block 512 can be implemented by locating instances of the noise sample 322 that is below the noise threshold 420 one by one, or all together at once.

Figure 6:
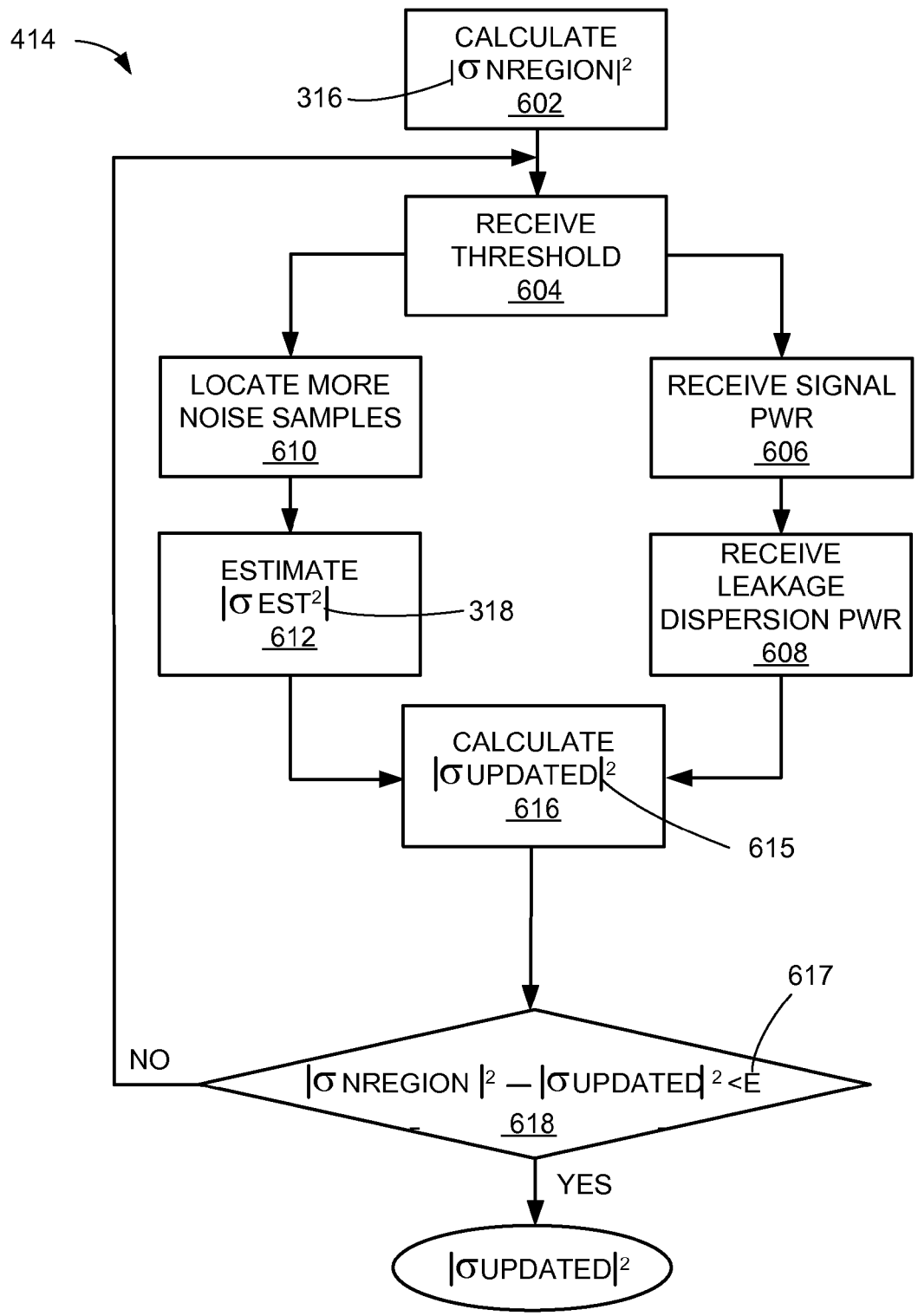
FIG. 6 is a further example of a flow chart of the operation of the noise variance module.

Referring now to FIG. 6, therein is shown a further example of a flow chart of the operation of the noise variance module 414. The noise variance module 414 can calculate the noise region variance 316 with the noise region 304 of FIG. 3 in a block 602. The noise variance module 414 can receive the noise threshold 420 of FIG. 4 from the threshold calculation module 421 of FIG. 4 based on the noise region variance 316 in a block 604.

The noise variance module 414 can receive the received signal power 120 of FIG. 1 from the signal power estimation module 422 of FIG. 4 in a block 606. For example, the signal power estimation module 422 can estimate the received signal power 120 by calculating the signal power in the signal region 302 of FIG. 3 minus any of the noise sample 322 of FIG. 3 in the signal region 302 below the noise threshold 420.

The noise variance module 414 can receive the dispersion power 426 of FIG. 4 calculated based on the received signal power 120 from the leakage estimation module 424 of FIG. 4 in a block 608. The noise variance module 414 can locate multiple instances of the noise sample 322 in the signal region 302 based on the noise threshold 420 in a block 610. The noise variance module 414 can estimate the noise variance estimate 318 based on the noise region 304 and the multiple instances of the noise sample 322 in a block 612.

Based on the dispersion power 426 and the noise variance estimate 318, the noise variance module 414 can update the noise variance estimate 318 or calculate a second variance 615, in a block 616. For example, the second variance 615 can be calculated based on Equation 7. When the absolute difference between the noise variance estimate 318 and the second variance 615 is less than an error tolerance 617, the noise variance module 414 can set the noise variance estimate 318 equal to the second variance 615 and output the second variance 615 in a block 618. When the absolute difference between the noise variance estimate 318 and the second variance 615 is not less than the error tolerance 617, than the noise variance module 414 can execute the block 602, and thus recursively calculates the noise variance estimate 318.

Figure 7:
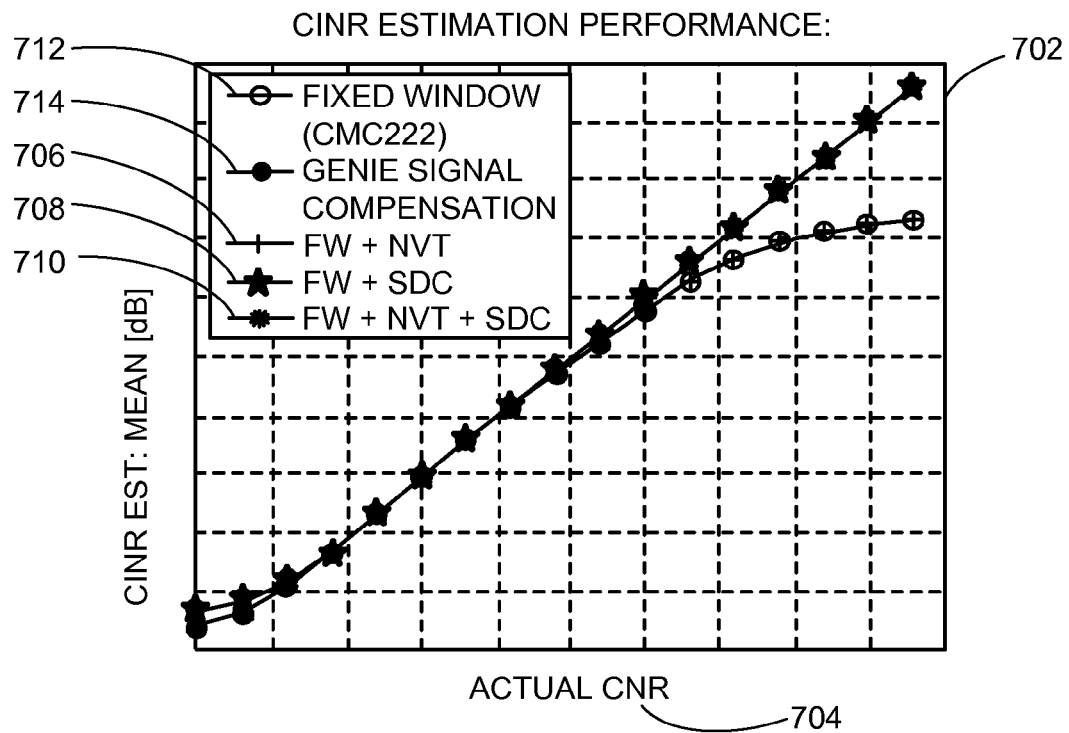
FIG. 7 is an example of a first mean performance chart of the mobile telecommunication system of FIG. 1.

Referring now to FIG. 7, therein is shown an example of a first mean performance chart 702 of the mobile telecommunication system 100 of FIG. 1. In the first mean performance chart 702, simulation results of a single-tap channel are presented. The first mean performance chart 702 illustrates the bias associated with each examples of the mobile telecommunication system 100. The x-axis of the first mean performance chart 702 is an actual signal to ratio 704. The y-axis of the first mean performance chart 702 is the signal to noise ratio 118 as estimated by the mobile telecommunication system 100.

A line 706 illustrates the example of the mobile telecommunication system 100 as shown in FIG. 5. A line 708 illustrates an example of the mobile telecommunication system 100 where the total noise variance 122 of FIG. 3 is calculated with compensation of the dispersion power 426 of FIG. 4 and where the total noise variance 122 is calculated without samples from the signal region 302. A line 710 illustrates the example of the mobile telecommunication system 100 as shown in FIG. 6.

A line 712 illustrates a fixed window estimation of the signal to noise ratio 118 where the signal to noise ratio 118 is calculated based on the noise sample 322 from only the noise region 304. A line 714 illustrates a Genie Signal Compensation estimation of the signal to noise ratio 118 where the signal to noise ratio 118 of FIG. 1 is calculated based on the noise sample 322 from only the noise region 304.

Figure 8:
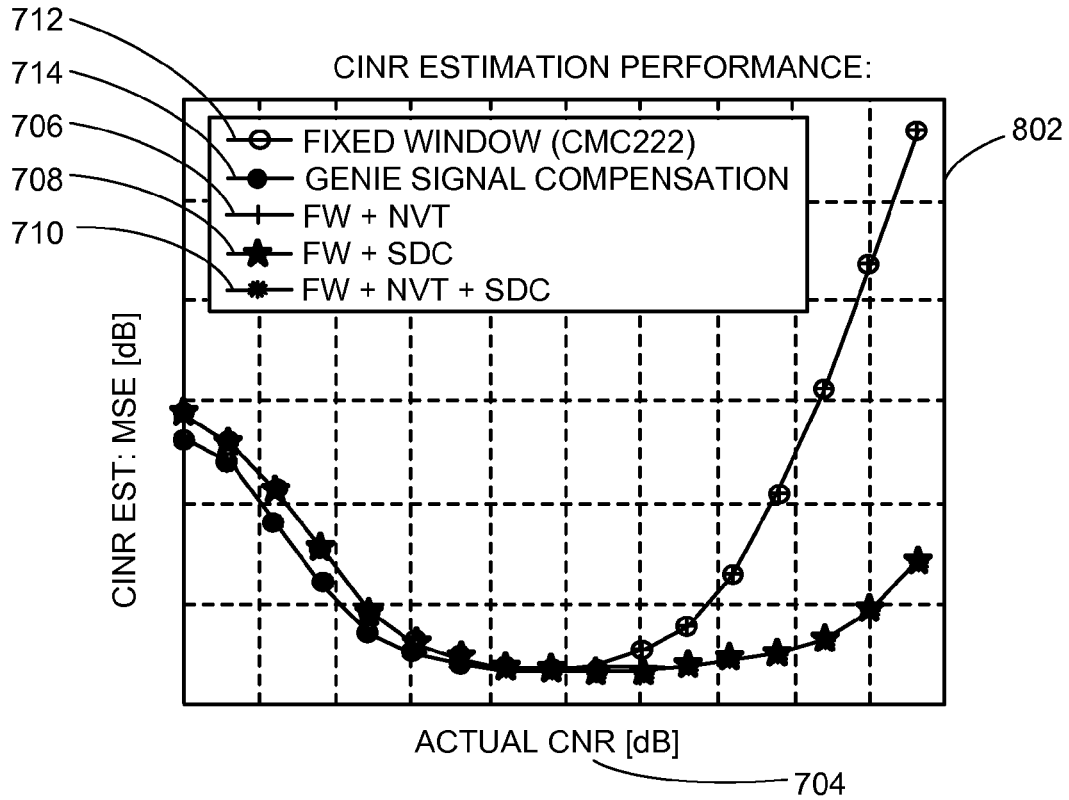
FIG. 8 is an example of a first performance error chart of the mobile telecommunication system of FIG. 1.

Referring now to FIG. 8, therein is shown an example of a first performance error chart 802 of the mobile telecommunication system 100 of FIG. 1. In the first performance error chart 802, simulation results of a single-tap channel are presented. The line 706, the line 708, the line 710, the line 712, and the line 714 are compared. The x-axis of the first performance error chart 802 illustrates the actual signal to noise ratio 704. The y-axis of the first performance error chart 802 illustrates the mean square error performance of the mobile telecommunication system 100 as compared to the actual signal to noise ratio 704.

Figure 9:
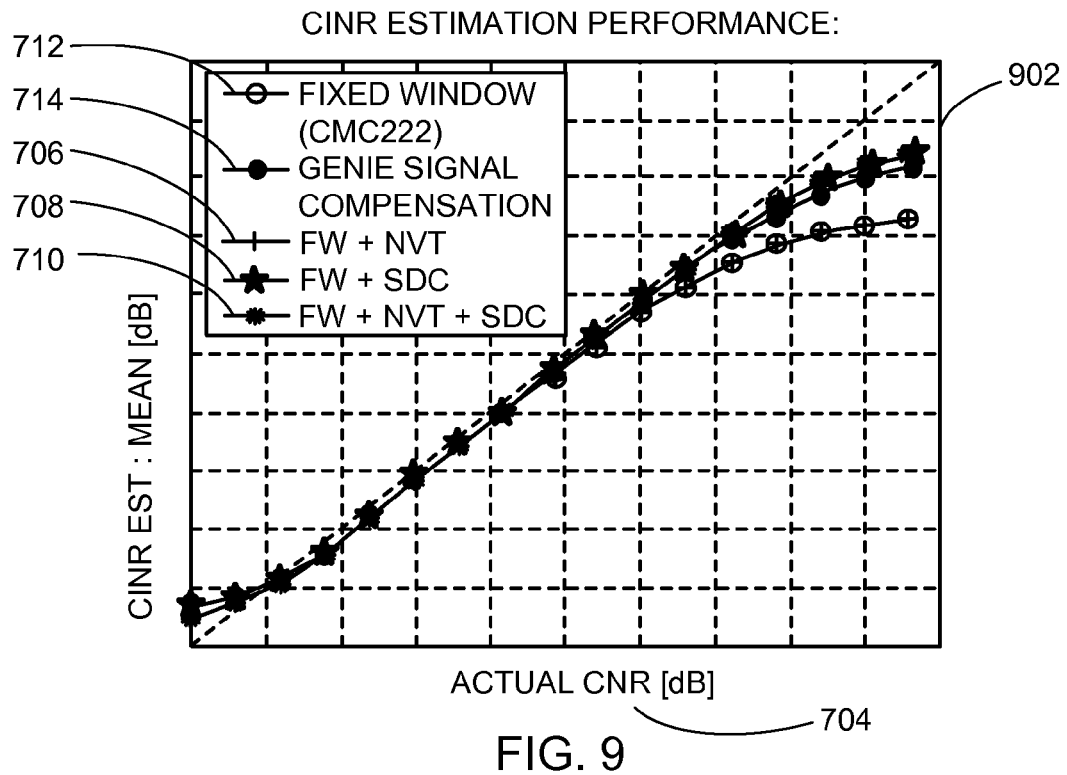
FIG. 9 is an example of a second mean performance chart of the mobile telecommunication system of FIG. 1.

Referring now to FIG. 9, therein is shown an example of a second mean performance chart 902 of the mobile telecommunication system 100 of FIG. 1. In the second mean performance chart 902, simulation results of a two-tap channel are presented. The line 706, the line 708, the line 710, the line 712, and the line 714 are again compared. The x-axis of the second mean performance chart 902 is the actual signal to ratio 704. The y-axis of the second mean performance chart 902 is the signal to noise ratio 118 of FIG. 1 as estimated by the mobile telecommunication system 100.

Figure 10:
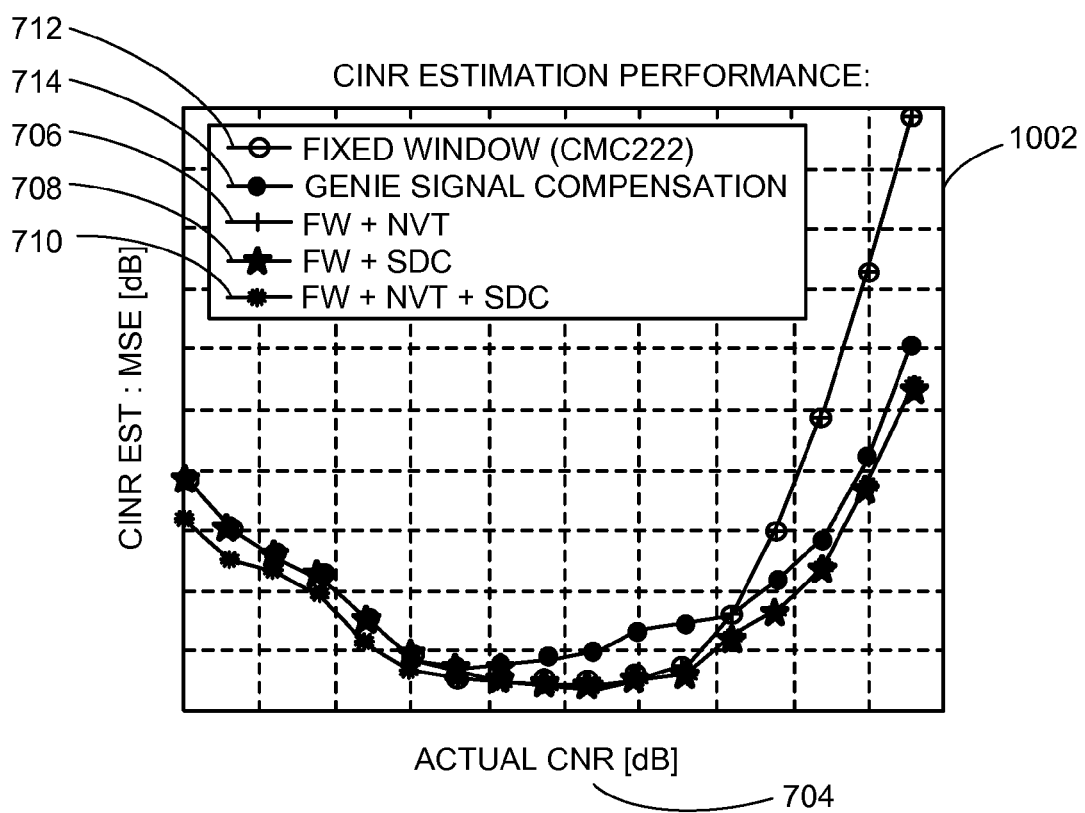
FIG. 10 is an example of a second performance error chart of the mobile telecommunication system of FIG. 1.

Referring now to FIG. 10, therein is shown an example of a second performance error chart 1002 of the mobile telecommunication system 100 of FIG. 1. In the second performance error chart 1002, simulation results of a two-tap channel are presented. The line 706, the line 708, the line 710, the line 712, and the line 714 are again compared. The x-axis of the second performance error chart 1002 is the actual signal to ratio 704. The y-axis of the second performance error chart 1002 illustrates the mean square error performance of the mobile telecommunication system 100 as compared to the actual signal to noise ratio 704.

Figure 11:
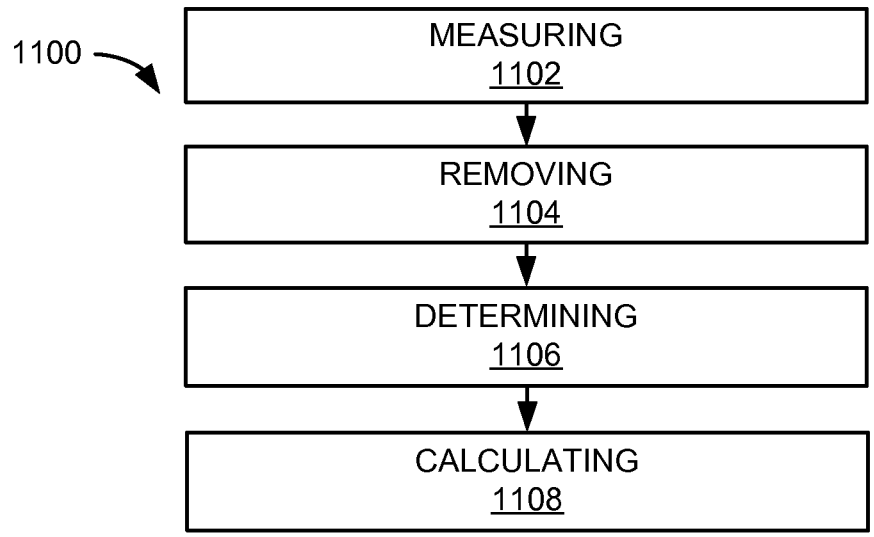
FIG. 11 is a flow chart of a method of operation of the mobile telecommunication system in a further embodiment of the present invention.

Referring now to FIG. 11, therein is shown a flow chart of a method 1100 of operation of a mobile telecommunication system in a further embodiment of the present invention. The method 1100 includes: measuring a received reference signal in a block 1102; removing a guard portion from the received reference signal in a block 1104; determining a noise variance estimate from both a noise region of the received reference signal and a noise sample in a signal region of the received reference signal in a block 1106; and calculating a signal to noise ratio from the noise variance estimate for adjusting the receiver device in a block 1108.

Figure 12:
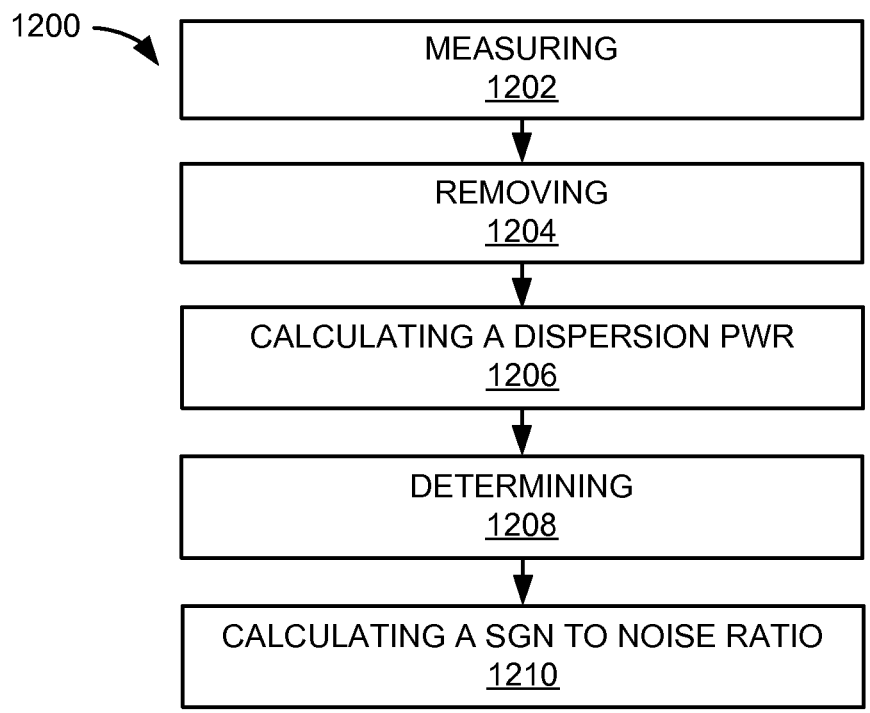
FIG. 12 is a flow chart of a method of operation of the mobile telecommunication system in a yet further embodiment of the present invention

Referring now to FIG. 12, therein is shown a flow chart of a method 1200 of operation of a mobile telecommunication system in a yet further embodiment of the present invention. The method 1200 includes: measuring a received reference signal in a block 1202; removing a guard portion from the received reference signal in a block 1204; calculating a dispersion power of a noise region of the received reference signal in a block 1206; determining a noise variance estimate based on at least the dispersion power in a block 1208; and calculating a signal to noise ratio from the noise variance estimate for adjusting a receiver device in a block 1210.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a mobile telecommunication system comprising:
    measuring a received reference signal over a total time interval including a first time interval and a second time interval for representing resource elements including cell-specific reference information;
    identifying a noise region for representing one or more samples received in the second time interval and a signal region for representing one or more samples received in the first time interval, wherein the noise region and the signal region are within the received reference signal;
    identifying a noise sample within the signal region;
    determining a noise variance estimate from both the noise region and the noise sample in the signal region, including determining the noise variance estimate from the noise sample in the signal region, with the noise sample below a noise threshold; and
    calculating a signal to noise ratio from the noise variance estimate for adjusting a receiver device.

2. The method as claimed in claim 1 further comprising:
    calculating a noise threshold based on a noise region variance; and
    wherein:
    determining the noise variance estimate includes determining the noise variance estimate from at least the noise sample in the signal region, with the noise sample including a magnitude below the noise threshold.

3. The method as claimed in claim 1 further comprising:
    calculating a delay spread estimate from the received reference signal; and
    sizing the signal region relative to the noise region based on the delay spread estimate.

4. The method as claimed in claim 1 wherein determining the noise variance estimate includes determining the noise variance estimate based on at least a dispersion power of the received reference signal.

5. A method of operation of a mobile telecommunication system comprising:
- measuring a received reference signal over a total time interval including a further time interval therein for representing resource elements including cell-specific reference information;
- circular-shifting the received reference signal by a shift size;
- identifying a noise region for representing one or more samples within the received reference signal received during the further time interval;
- calculating a dispersion power of the noise region in the received reference signal;
- determining a noise variance estimate based on at least the dispersion power; and
- calculating a signal to noise ratio from the noise variance estimate for adjusting a receiver device.

6. The method as claimed in claim 5 wherein determining the noise variance estimate includes calculating the noise variance estimate by subtracting the dispersion power from a noise region variance.

7. The method as claimed in claim 5 wherein calculating the dispersion power includes calculating the dispersion power by multiplying a received signal power in the signal region of the received reference signal by a leakage ratio, the leakage ratio based on a prefix sample size, a shift size, or a combination thereof.

8. The method as claimed in claim 5 wherein determining the noise variance estimate includes determining the noise variance estimate from the noise sample in the signal region of the received reference signal.

9. A mobile telecommunication system comprising:
- an antenna configured to receive a received reference signal over a total time interval including a first time interval and a second time interval for representing resource elements including cell-specific reference information;
- a control unit including circuitry, coupled to the antenna, configured to:
  - identify a noise region for representing one or more samples received in the second time interval and a signal region for representing one or more samples received in the first time interval, wherein the noise region and the signal region are within the received reference signal;
  - identify a noise sample within the signal region;
  - determine a noise variance estimate from both the noise region and the noise sample in the signal region, including determining the noise variance estimate from the noise sample in the signal region, with the noise sample below a noise threshold; and
  - calculate a signal to noise ratio from the noise variance estimate for adjusting a receiver device.

10. The mobile telecommunication system as claimed in claim 9 wherein the control unit is configured to:
- calculate a noise threshold based on a noise region variance; and
- determine the noise variance estimate from at least the noise sample in the signal region, with the noise sample including a magnitude below the noise threshold.

11. The mobile telecommunication system as claimed in claim 9 wherein the control unit is configured to:
- calculate a delay spread estimate from the received reference signal; and
- size the signal region relative to the noise region based on the delay spread estimate.

12. The mobile telecommunication system as claimed in claim 9 wherein the control unit is configured to determine the noise variance estimate based on at least a dispersion power of the received reference signal.

13. A mobile telecommunication system comprising:
- an antenna configured to receive a received reference signal over a total time interval including a further time interval therein for representing resource elements including cell-specific reference information;
- a control unit including circuitry, coupled to the antenna, configured to:
  - circular-shift the received reference signal by a shift size;
  - identify a noise region for representing one or more samples within the received reference signal received during the further time interval;
  - calculate a dispersion power of the noise region of the received reference signal;
  - determine a noise variance estimate based on at least the dispersion power; and
  - calculate a signal to noise ratio from the noise variance estimate for adjusting a receiver device.

14. The mobile telecommunication system as claimed in claim 13 wherein the circuit is configured to calculate the noise variance estimate by subtracting the dispersion power from a noise region variance.

15. The mobile telecommunication system as claimed in claim 13 wherein the circuit is configured to calculate the dispersion power by multiplying a received signal power in the signal region of the received reference signal by a leakage ratio based on a prefix sample size, a shift size, or a combination thereof.

16. The mobile telecommunication system as claimed in claim 13 wherein the circuit is configured to determine the noise variance estimate from the noise sample in the signal region of the received reference signal.

* * * * *